United States Patent
Dhanda et al.

(10) Patent No.: US 9,049,723 B2
(45) Date of Patent: Jun. 2, 2015

(54) SYSTEM AND METHODS FOR INCREASING NETWORK EFFICIENCY USING VAMOS CHANNELS ON A MULTI-SIM DEVICE

(71) Applicant: QUALCOMM Incorporated, San Diego, CA (US)

(72) Inventors: Mungal S. Dhanda, Slough (GB); Zhi-Zhong Yu, Reading (GB); Divaydeep Sikri, Woking (GB)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 13/897,387

(22) Filed: May 18, 2013

(65) Prior Publication Data

US 2014/0341184 A1 Nov. 20, 2014

(51) Int. Cl.
*H04W 4/00* (2009.01)
*H04W 72/04* (2009.01)
*H04W 36/00* (2009.01)
*H04W 88/02* (2009.01)

(52) U.S. Cl.
CPC ............ *H04W 72/048* (2013.01); *H04W 36/00* (2013.01); *H04W 88/02* (2013.01); *Y02B 60/50* (2013.01)

(58) Field of Classification Search
CPC ............ H04W 52/02; H04W 52/0209; H04W 52/0212; H04W 52/0225; H04W 52/0251; H04W 36/00; H04W 88/02
USPC .................................. 370/331, 329, 337, 339
See application file for complete search history.

(56) References Cited

U.S. PATENT DOCUMENTS

| | | | |
|---|---|---|---|
| 2010/0081445 A1 | 4/2010 | Aghili et al. | |
| 2010/0311339 A1* | 12/2010 | Chung et al. | 455/41.3 |
| 2011/0077031 A1 | 3/2011 | Kim et al. | |
| 2011/0212737 A1* | 9/2011 | Isidore | 455/466 |
| 2012/0021744 A1 | 1/2012 | Chin et al. | |
| 2012/0021755 A1 | 1/2012 | Chin | |
| 2012/0028657 A1 | 2/2012 | Chin et al. | |
| 2012/0040672 A1 | 2/2012 | Chin et al. | |
| 2012/0113878 A1* | 5/2012 | Yu et al. | 370/311 |
| 2013/0005394 A1 | 1/2013 | Geary et al. | |

(Continued)

FOREIGN PATENT DOCUMENTS

EP 2498567 A1 9/2012
WO 2010132398 A1 11/2010

OTHER PUBLICATIONS

Partial International Search Report—PCT/US2014/038523—ISA/EPO—Sep. 5, 2014.

(Continued)

*Primary Examiner* — Pao Sinkantarakorn
*Assistant Examiner* — Stephen Steiner
(74) *Attorney, Agent, or Firm* — The Marbury Law Group, PLLC

(57) ABSTRACT

Methods are provided that optimize Voice over Adaptive Multi-user channels on One Slot (VAMOS) communications by recognizing that up to four independent communications are located on the same device, and assigning them to sub-channels of the same VAMOS channel. A VAMOS-capable multi-SIM wireless device such as a dual-SIM dual active (DSDA) device may have up to four simultaneous active calls on the same access network. When assigned to the same VAMOS channel, the up to four active calls may be merged to all use the same radio on the device.

96 Claims, 10 Drawing Sheets

(56) References Cited

U.S. PATENT DOCUMENTS

2013/0237226 A1* 9/2013 Periyalwar et al. ........... 455/436
2013/0288741 A1* 10/2013 Sjadieh et al. ............. 455/552.1

OTHER PUBLICATIONS

International Search Report and Written Opinion—PCT/US2014/038523—ISA/EPO—Jan. 12, 2015.

* cited by examiner

SYSTEM AND METHODS FOR INCREASING NETWORK EFFICIENCY USING VAMOS CHANNELS ON A MULTI-SIM DEVICE

FIELD

The present invention relates generally to using Voice services over Adaptive Multiuser channels on One Slot (VAMOS), and more particularly to optimizing VAMOS channel use by pairing communications on a multi-SIM device.

BACKGROUND

Voice services over Adaptive Multiuser Channels on One Slot (VAMOS) is a technology described in the 3GPP GERAN specification that may double the speech capacity in Global System for Mobile Communications (GSM) systems. VAMOS communications generally involve multiplexing a pair of wireless devices served by the same base station on two sub-channels of a single base station radio resource (i.e., physical channel). Benefits of VAMOS include doubling base station transceiver peak capacity, optimizing spectrum utilization, and reducing base station power consumption.

In particular, use of VAMOS channels enables allocating different power levels to wireless devices experiencing different radio conditions, such as where one device is located farther from the base station than the other. However, extra power assigned to one sub-channel occurs at the expense of the other sub-channel. Therefore, VAMOS pairing is optimal when both wireless devices are moving in the same direction and require similar power levels (i.e., at similar distances from the base station). Determining such optimal pairing requires the base station to perform operations that measure and compare real time radio parameters of candidate VAMOS-capable devices, which uses up additional time and resources on the network.

SUMMARY

Systems, methods, and devices of the various embodiments optimize allocation of VAMOS channels to derive spectrum and power use efficiencies on both the network and wireless devices by using the technology to multiplex up to four communications sessions ongoing with a single wireless device. In an embodiment, allocating physical channels by a base station in a wireless communications network may include providing communications services for up to four communications sessions (for example, two communications sessions) active on a single wireless device, in which a first active communications session is associated with a first RF resource and a second active communications session is associated with a second RF resource. Circumstances in which this is possible may be recognized by receiving information from the first and second RF resources indicating that the first and second RF resources are capable of supporting VAMOS communications, and recognizing when the first RF resource and the second RF resource are co-located within a single wireless device. Embodiment methods may further include assigning a VAMOS channel to the first and second active communications sessions in response to determining that the first RF resource and the second RF resource are co-located within a single wireless device, multiplexing the first active communications session and the second active communications session onto sub-channels of the assigned VAMOS channel, and transmitting the first and second active communications sessions simultaneously on the assigned VAMOS channel such that data is simultaneously received by the first RF resource and the second RF resource.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
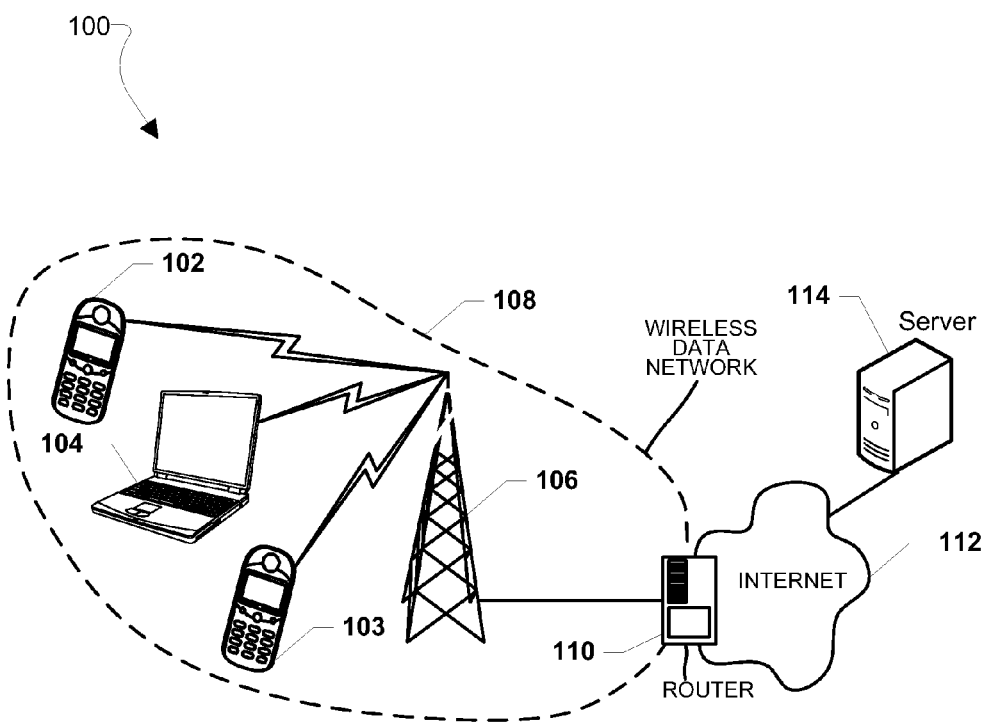
FIG. 1 is a communication system block diagram of a network suitable for implementing with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "wireless device," "wireless communications device," and "mobile device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "SIM", "SIM card" and "subscriber identification module" are used interchangeably to mean an integrated circuit, embedded into a removable card, that stores an International Mobile Subscriber Identity (IMSI), related key, and/or other information used to identify and/or authenticate a wireless device on a network. The term SIM may also be used as shorthand reference to a communication network associated with a particular SIM, since the information stored in a SIM enables the wireless device to establish a communication link with a particular network, thus the SIM and the communication network correlate to one another.

As used herein, the terms "multi-SIM device," "multi-SIM wireless device" "dual-SIM device" "dual-SIM dual active device" and "DSDA device" are used interchangeably to describe a wireless device that is configured with more than one SIM and is capable of independently handling communications with networks of multiple subscriptions.

As used herein, the terms "VAMOS", VAMOS communications" and "VAMOS mode" refer to situations in which multiple active communications sessions are paired on a physical channel using processes specified for Voice services over Adaptive Multi-user channels on One Slot (VAMOS).

One of the current topics of interest in 3GPP is reducing energy consumption in wireless communications systems. An example of a technology that may serve to increase speech capacity, and therefore improve energy efficiency, in a wireless communication system is the use of voice services over adaptive multi-user channels on one slot ("VAMOS"). Using VAMOS mode allows two full-rate speech channels, or up to four half-rate speech channels, to be multiplexed onto the same time slot and frequency by the station. In this manner, VAMOS enables two downlink transmissions (i.e., to two wireless devices) to be sent by the base station on the same signal. Thus, using VAMOS communications may double the speech capacity of a GSM network.

While VAMOS mode communications provide many benefits with respect to network efficiencies, such communications introduce new issues as well. For example, while a base station serving devices paired on a VAMOS channel only needs to transmit one carrier signal on the downlink, the devices each send a separate uplink transmission, each of which arrive simultaneously at the base station. Thus, operation in VAMOS mode may require the base station to employ complex demodulation algorithms to distinguish the up to four different communications on the uplink.

Further, due to the orthogonal sub-channel modulation scheme, which is discussed in further detail below, allocating greater transmit power to transmissions sent to one device necessarily decreases the transmit power of signals sent to its paired device. Therefore, the base station must obtain sufficient measurements of radio channel requirements in order to pair devices that have comparable radio path conditions and power requirements. The base station may need to repeat these measurements frequently, since devices may move to a new location at any time.

In the various embodiments, VAMOS communications may be utilized in more circumstances by applying VAMOS mode to communications on the same wireless device, such as on a DSDA or other multi-SIM wireless device. In the various embodiments, up to four active calls on SIMs of the same DSDA device may be assigned to the same physical channel on the access network in a VAMOS pair. In an embodiment, assigning multiple connections within a single wireless device to the same VAMOS channel provides efficiencies on both the network side and the wireless device, including for spectrum utilization and battery power. The various embodiments may therefore utilize the full capabilities of VAMOS techniques to achieve efficient communications when one wireless device is operating in the DSDA mode.

Multi-SIM wireless communications devices provide at least two subscriptions in a single wireless device, thereby providing users with flexibility in service options. One type of multi-SIM wireless device, a dual-SIM dual active (DSDA) device, allows simultaneous active connections with the networks corresponding to both SIMs. Dual-SIM dual active (DSDA) devices, which typically have two radios, may allow simultaneous communications on accounts/subscriptions supported by each of two SIM cards. For example, a single user of a DSDA device may be engaged in up to four active voice calls at the same time (for example, two active calls) by making a first call on a first subscription, putting that call on hold, and making a second call on the second subscription. In the various embodiments, both SIMs of a DSDA device may be configured to connect to the same access network. For example, a user may have business and personal subscriptions with the same carrier, or subscriptions with a real network and with a virtual network operator that uses its access network.

FIG. 1 illustrates a wireless network system 100 suitable for use with the various embodiments. Wireless communications devices 102, 103, and 104 and a wireless transmitter/receiver 106 together make up a wireless data network 108. Using the wireless data network 108, data may be transmitted wirelessly between the wireless devices 102, 103, and 104 and the wireless cell tower or base station 106 over an air interface. The air interface transmissions between the wireless devices 102, 103, and 104 and the wireless cell tower or base station 106 may be by any of a number of cellular networks, for example, GSM/GPRS, EDGE/EGPRS, UMTS, WCDMA, HSPA, LTE, etc. The wireless network 108 may be in communication with a router 110 which connects to the Internet 112. In this manner data may be transmitted from/to the wireless devices 102, 103, and 104 via the wireless network 108, and router 110 over the Internet 112 to/from a server 114 by methods well known in the art. While the various embodiments are particularly useful with wireless networks, the embodiments are not limited to wireless networks and may also be implemented over wired networks with no changes to the methods. The communication system illustrated in FIG. 1 may include further network elements such as a Serving General Packet Radio Service (GPRS) Support Node (SGSN) (not shown).

Some or all of the wireless devices 102 may be configured with dual-SIM dual active (DSDA) capability, which enables a dual-SIM device to simultaneously participate in two independent communications sessions, generally though independent transmit/receive chains.

Figure 2:
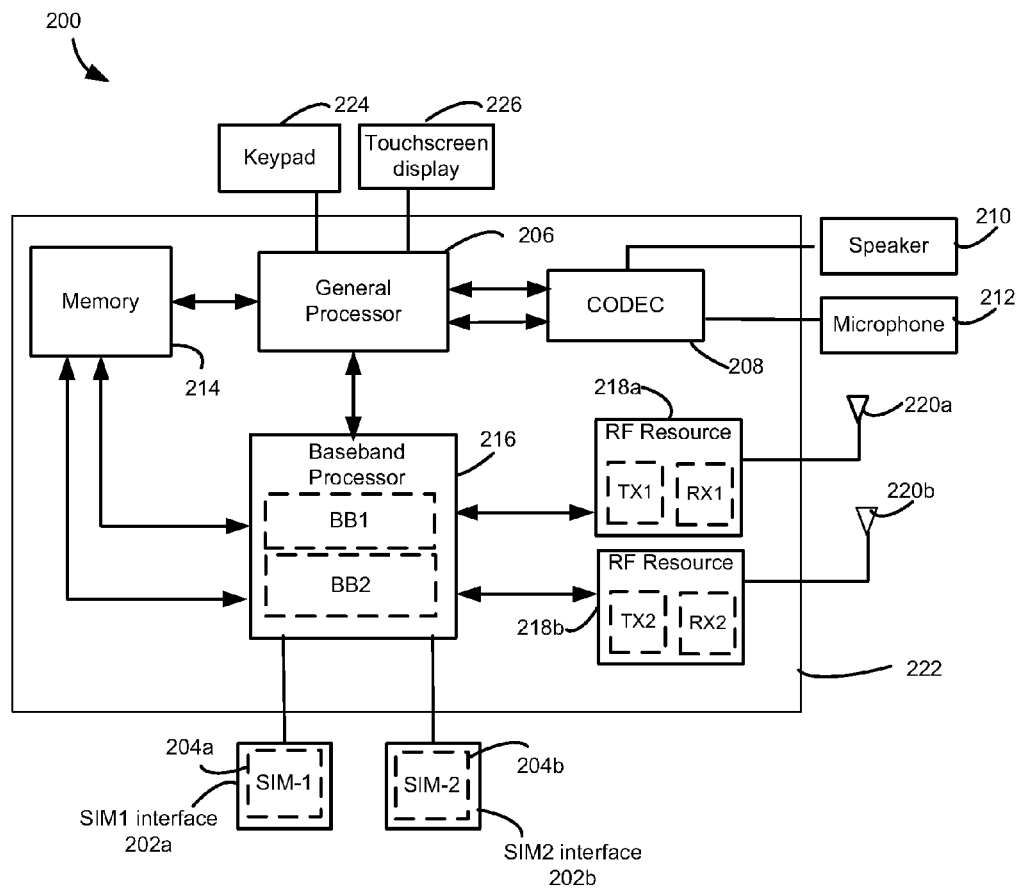
FIG. 2 is a block diagram illustrating a dual-SIM dual active wireless communications device according to an embodiment.

FIG. 2 is a functional block diagram of a multi-SIM wireless device 200 that is suitable for implementing the various embodiments. Wireless devices 200 may include a first SIM interface 202a, which may receive a first identity module SIM-1 204a that is associated with the first subscription. The wireless device 200 may also include a second SIM interface 202b, which may receive a second identity module SIM-2 204b that is associated with the second subscription.

A SIM in the various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM card may have a CPU, ROM, RAM, EEPROM and I/O circuits. A SIM used in the various embodiments may store user account information, an international mobile subscriber identity (IMSI), a set of SIM application toolkit (SAT)

commands and storage space for phone book contacts. A SIM card may further store a Home Public-Land-Mobile-Network (HPLMN) code to indicate the SIM card network operator provider. An Integrated Circuit Card Identity (ICCID) SIM serial number is printed on the SIM card for identification.

Wireless devices 200 may include at least one controller, such as a general processor 206, which may be coupled to a coder/decoder (CODEC) 208. The CODEC 208 may in turn be coupled to a speaker 210 and a microphone 212. The general processor 206 may also be coupled to at least one memory 214. The memory 214 may be a non-transitory tangible computer readable storage medium that stores processor-executable instructions. For example, the instructions may include routing communication data relating to the first or second subscription though a corresponding baseband –RF resource chain.

The memory 214 may store operating system (OS) software, as well as user application software and other executable instructions. The memory 214 may also store application data. The general processor 206 and memory 214 may each be coupled to at least one baseband modem processor 216. Each SIM in the wireless device 200 (e.g., SIM-1 202a and SIM-2 202b) may be associated with a baseband-RF resource chain. Each baseband-RF resource chain may include baseband modem processor 216 to perform baseband/modem functions for wireless communications based on subscription and configuration data stored on a SIM, and one or more amplifiers and radios, referred to generally herein as RF resources 218. In one embodiment, baseband-RF resource chains may share a common baseband modem processor 206 (i.e., a single device that performs baseband/modem functions for all SIMs on the wireless device). Alternatively, each baseband-RF resource chain may include physically or logically separate baseband processors (e.g., BB1, BB2).

RF resources 218a, 218b may each be transceivers that perform transmit/receive functions for the associated SIM of the wireless device. RF resources 218a, 218b may include separate transmit and receive circuitry, or may include a transceiver that combines transmitter and receiver functions. The RF resources 218a, 218b may be coupled to a wireless antenna (e.g., a first wireless antenna 220a and a second wireless antenna 220b).

In a particular embodiment, the general processor 206, memory 214, baseband processor(s) 216, and RF resources 218a, 218b may be included in a system-on-chip device 222. The first and second SIMs 202a, 202b and their corresponding interfaces 204a, 204b may be external to the system-on-chip device 222. Further, various input and output devices may be coupled to components of the system-on-chip device 216, such as interfaces or controllers. Example user input components suitable for use in the wireless device 200 may include, but are not limited to, a keypad 224 and a touchscreen display 226.

In an embodiment, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in wireless device 200 to enable communication between them, as is known in the art.

In an example wireless communications system, a base station may communicate over an air interface with each wireless device through control and data communication resources allocated by the base station over the wireless data network. A base station controller (BSC) may control functions for a plurality of base stations (i.e., base transceiver stations). The BSC may handle radio channel allocation to wireless devices, and may control handovers of wireless devices between base stations. The BSC may be connected to a mobile switching center, which is the primary service delivery node for voice, SMS, data, and other communications (e.g., GSM service). The MSC may set up and release end-to-end connections, and may handle account monitoring for calls. The MSC may be coupled to a visitor location register (VLR), which may be coupled to a home location register (HLR) contains details of each SIM that is authorized to use the GSM network.

Figure 3:
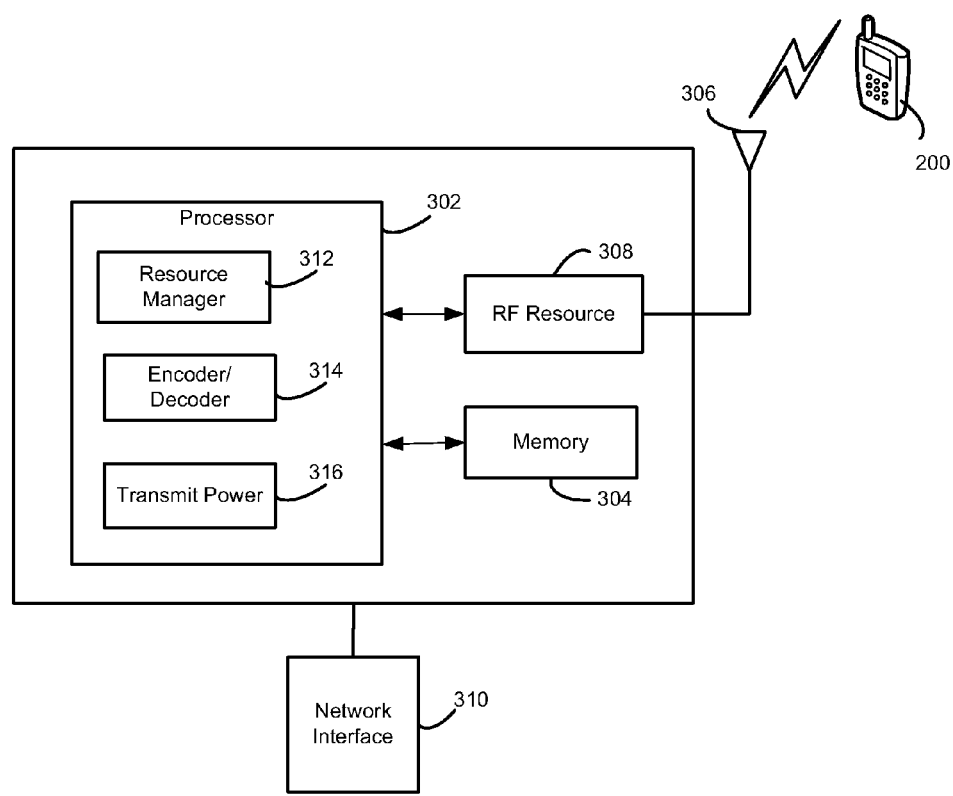
FIG. 3 is a block diagram illustrating a base station according to an embodiment.

FIG. 3 illustrates an embodiment base station 300 for providing communications services to wireless devices (e.g., wireless device 200) within its cell location, including VAMOS communications. The base station 300 may transmit downlink signals using a 3GPP GERAN protocol. On each carrier, the base station may transmit a sequence of frames (e.g., a multiframe) with each frame having eight time slots.

The base station may include a processor 302 (e.g., baseband processor), a memory 304, at least one antenna 306, and at least one RF resource 308 (e.g., a transceiver) coupled to the antenna 306 and the processor 302 for bidirectional wireless communication. The base station 300 may provide point-to-point and/or point-to-multipoint communication services. The base station 300 may be coupled to a network interface 310 that connects with a network control element (e.g., a base station controller), which may in turn interface with a core network providing access to a public switched telephone network (PSTN). The base station processor 302 may be one processing unit that performs all functions, or alternatively may include multiple processing units.

In an embodiment, the base station processor 302 may include a resource manager 312, which may assign communication channels to wireless devices for voice communications to/from the base station 300. The base station processor 302 may also include an encoder/decoder unit 314 to encode and decode individual bits forming a communication message, and a transmit power setting unit 316 to set transmit power on different channels and VAMOS sub-channels. The RF resource 308 may be one or more device that is capable of supporting duplex communications for transmit/receive functions of the base station 300. For example, RF resource 308 may include separate transmit and receive circuitry, or may include one or more transceiver that combines transmitter and receiver functions. The RF resource 308 may modulate information onto a carrier waveform for transmission via the antenna 306 to one or more wireless device, and may demodulate information received via the antenna 306 for further processing. The memory 304 may be one or more memory devices capable of storing programs that, when executed by the base station processor 302, enable the base station to perform communication tasks in the various embodiments.

For clarity, while the techniques and embodiments described herein relate to a wireless device configured with GSM subscriptions, they may be extended to subscriptions on other radio access networks (e.g., UMTS, WCDMA, LTE, etc.).

The GSM standard employs a multiple access scheme that defines how simultaneous communication can occur between different wireless devices and base stations. GSM employs a combination of Time Division Multiple Access (TDMA) and Frequency Division Multiple Access (FDMA) for the purpose of sharing the spectrum resources. The available spectrum is divided into carrier frequencies of 200 kHz each, with pairs of carriers that are 45 MHz apart from each other identified by an absolute radio-frequency channel number (ARFCN). A single base station may have several Transceivers (TRX) assigned to it, each having its own ARFCN.

Each pair of carrier frequencies (one uplink, one downlink) is also divided into eight time slots (TS0 through TS7) using TDMA such that eight consecutive time slots form one TDMA frame, lasting approximately 4.615 ms. In this manner individual physical channels may be formed, each of which correspond to a particular carrier frequency and time slot number. Logical channels may be mapped to the physical channels, and categorized by the information carried. Specifically, Traffic Channels (TCH) may carry speech or user data in a circuit switched or packet switched network, and control channels may carry signaling or synchronization data in a circuit switched or packet switched network. A wireless communications device may be assigned one or more time slot indices for the duration of a call. User-specific data for each wireless communication device may be sent in the time slot(s) assigned to that wireless communications device, and in TDMA frames used for the traffic channels.

The VAMOS feature was introduced in 3GPP GERAN Release 9 standards in order to improve the spectrum efficiency for Circuit Switched (CS) connections. VAMOS channel communications may serve multiple wireless communication devices simultaneously on the same physical resources/channels (i.e., on the same ARFCN and time slot). Thus, a basic physical channel capable of VAMOS may support up to two full-rate speech, or up to four half-rate speech traffic channels along with their associated control channels. It is also possible to operate one half-rate channel using non-VAMOS mode and two half-rate channels using VAMOS mode thus permitting three independent connections over the same timeslot and ARFCN.

VAMOS communications may be enabled through use of a modulation scheme on the downlink that encodes two bits per modulation symbol, such as Adaptive Quadrature Phase-Shift Keying (AQPSK). On a given time slot, AQPSK may be used to modulate up to four transmissions on up to four mutually orthogonal quadrature sub-channels in order to create a single VAMOS channel. A base station may use AQPSK to create the single VAMOS channel for downlink transmission to multiple wireless devices. For example, two sets of TCH burst bits may be modulated by a base station onto a single VAMOS channel and transmitted on the downlink to two wireless devices. On the uplink, however, a base station using VAMOS mode typically receives up to four, such as two, simultaneous transmissions from the two wireless devices respectively, and uses a multi-user detection algorithm to demodulate the two signals. As discussed above, receiving two signals on the uplink, and resolving which corresponds to each particular device, requires using additional time, channel resources, and power compared to receiving one signal. Further, a base station typically must perform measurement of radio channel requirements of VAMOS-capable devices in order to properly pair candidates. For example, a base station must determine the real time relative locations of devices, their power requirements, the probability that they will remain in that location, etc.

In implementing the AQPSK modulation scheme, the base station may assign two or more devices to first and second sub-channels. The power distribution between the sub-channels, (Sub-channel Power Imbalance Ratio ("SCPIR")), may be controlled by a VAMOS Sub-channel Power Control feature. SCPIR may be measured as: $SCPIR=10 \log_{10}(P1/P2)$, where P1 is the transmit power allocated to one sub-channel, P2 is the transmit power allocated to the other sub-channel, and P1+P2 equals the total transmit power allocated to the two devices. At a SCPIR of 0 dB, both devices may be allocated equal downlink power. At a SCPIR that does not equal zero, one sub-channel is allocated more power than the other, and the sub-channel with the smaller power allocation may experience greater interference.

Figure 4:
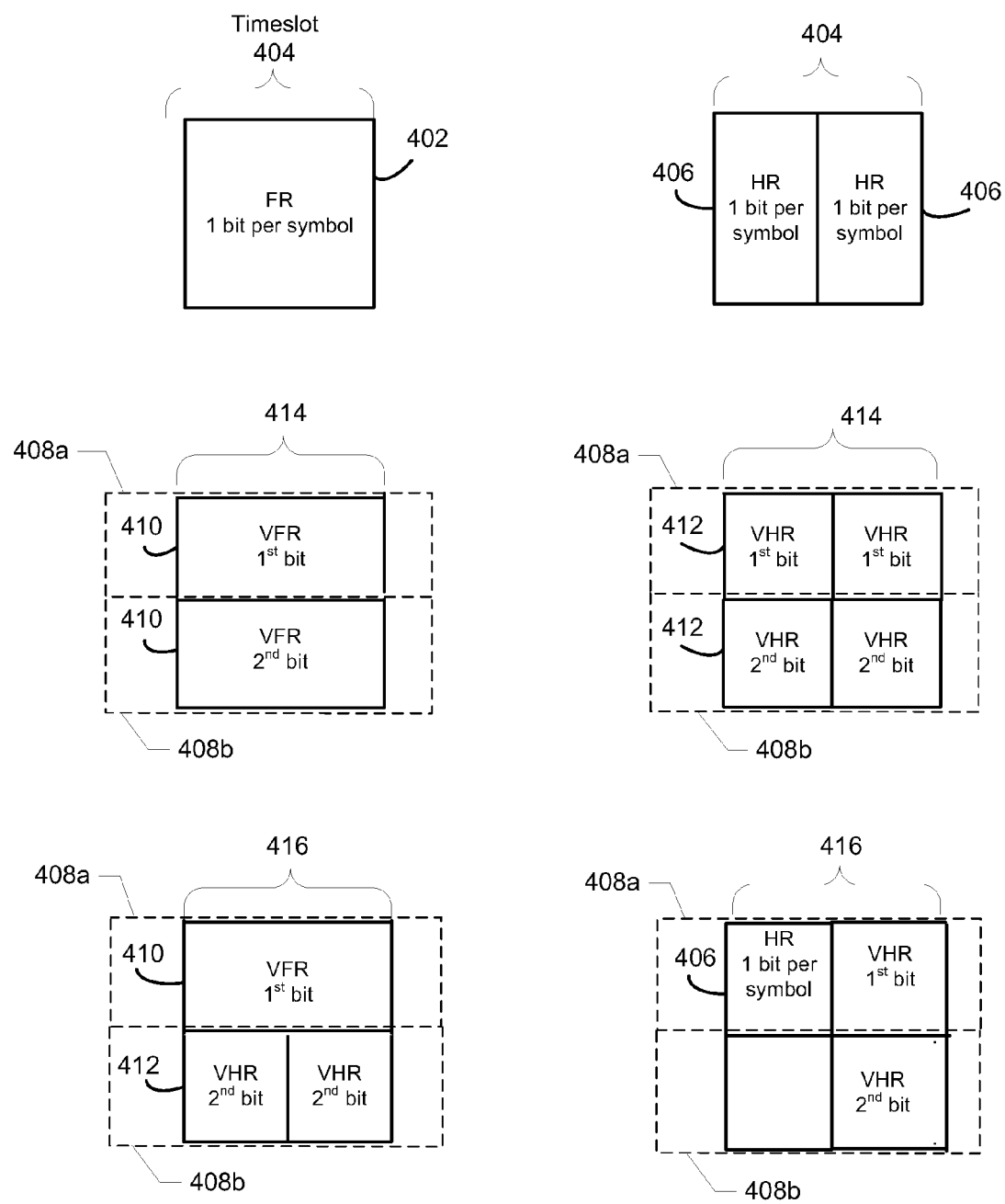
FIG. 4 is a diagram schematically illustrating combinations for full-rate and half-rate speech encoding in VAMOS-mode to accommodate different communications sessions on the same physical channel.

FIG. 4 illustrates various combinations of VAMOS, non-VAMOS, full-rate, and half-rate encoded speech, which may be used in the various embodiments to accommodate calls on the same physical channel in the VAMOS-mode to accommodate different communications sessions on the same physical channel.

In normal (i.e., non-VAMOS) mode, one FR service 402 may be supported on a time slot 404. Alternatively, two HR services 406 may be supported on time slot 404, dividing a TCH by alternating even and odd frame numbers. In the VAMOS mode, two transmissions on the uplink or downlink may be paired using AQPSK, which provides an additional channel division into sub-channels 408a, 408b. Therefore, two VAMOS full-rate speech (VFR) services 410 or up to four VAMOS half-rate speech (VHR) services 412 may be supported on one time slot 414.

Combinations of three different services on the same time slot may be enabled using different frame and channel divisions. For example, on a time slot 416 one VFR service 412 may be assigned to a first sub-channel 408a, while two VHR services 414 may be assigned to even and odd frame numbers on a second sub-channel 408b. In another example, one HR service 406 may occupy even frame numbers on time slot 416, while two VHR services 414 may be assigned to sub-channels 408a, 408b for the odd frame numbers.

In the various embodiments, the base station may provide efficient spectrum use in VAMOS mode by recognizing that two terminals are associated with the same wireless device (e.g., a DSDA device), and pairing the two terminals on a single VAMOS channel. As used herein, a "terminal" may be any device, circuitry, functional component, or combination thereof that is configured to send/receive communications signals in a GSM network. A "terminal" may refer, without limitation, to a wireless device, a transmit/receive chain within a wireless device, etc.

In an embodiment, the terminals may be RF resources that are co-located within a wireless device, and that are associated with communications on different SIMs. RF resources that are in the same device are at the same distance from the base station, and therefore experience the same radio path conditions. Consequently the values of P1 and P2 may be equal, and the SCPIR value for a VAMOS channel in the various embodiments may be zero. In this manner, the base station may bypass steps typically required to assign a VAMOS pair, such as evaluating power level requirements, movement, direction, etc.

On the device side, in the various embodiments the dual-SIM device may use AQPSK modulation to send two data streams in a single VAMOS transmission on the uplink, in addition to the normal receiving of AQPSK modulated data on the downlink. In an embodiment, two sets of transmit channel burst bits may be modulated by the dual-SIM wireless device onto a single VAMOS channel and transmitted on the uplink to the base station. On each side (base station and wireless device), a single RF resource may demodulate the AQPSK signal, and the baseband processor may decode the two communications. In this manner, the VAMOS uplink signal may appear equivalent to an uplink signal from one wireless device with respect to use of physical channel resources.

Functions implemented by a base station or dual-SIM device to process data for VAMOS transmission using AQPSK modulation may be performed by components including, but not limited to, a baseband processor, an RF resource, or a combination thereof. In the various embodiments, a first set of TCH burst bits intended for a first recipient and a second set of TCH burst bits intended for a second recipient may be encoded by one or more channel encoders. The first set of TCH burst bits may be assigned a first training sequence code (TSC), and the second set of TCH burst bits may be assigned a second TSC for a burst transmission in the same time slot. The first and second training sequence codes may be associated with first and second sub-channels of the same time slot in an ARFCN. Such TSCs may be provided from a set of orthogonal training sequence codes developed to minimize cross-channel correlation for VAMOS communications. The first and second sets of TCH burst bits may be mapped onto the ARFCN and timeslot by an AQPSK modulator.

Figure 5A:
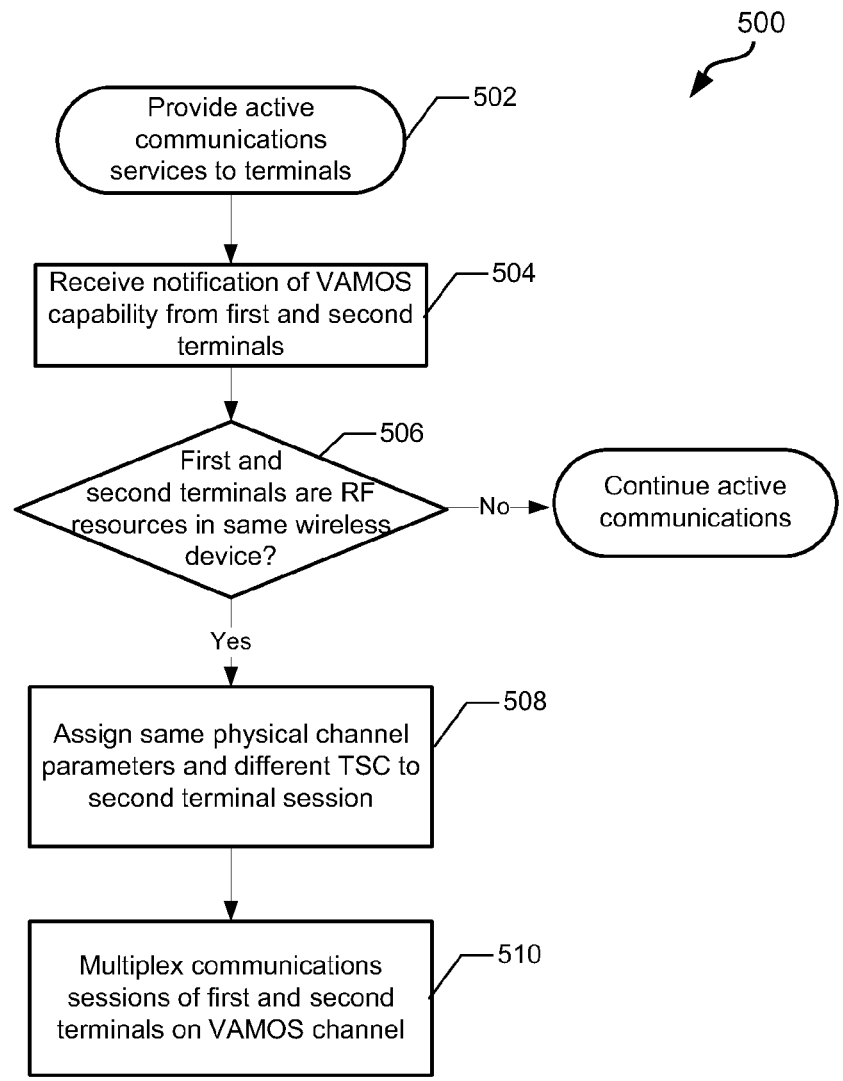
FIGS. 5A and 5B are process flow diagrams illustrating embodiment methods for pairing devices on assigned VAMOS channels.

FIG. 5A illustrates an embodiment method of allocating VAMOS channels to improve network efficiency. In block 502, an access network may provide active communications services to multiple terminals through connections with a nearby base station. In block 504, the base station may receive a notification of VAMOS capability from a first terminal and a second terminal served by the base station. In determination block 506, the base station may determine whether the VAMOS-capable first and second terminals are RF resources located within the same wireless device (e.g., a DSDA device). This determination may be made, for example, by determining whether the active communications with the first and second terminals are associated with identical International Mobile Station Equipment Identities (IMEIs).

If the base station determines that the first and second terminals are not RF resources located within the same wireless device (i.e., determination block 506="No"), the base station may continue with normal call processing for VAMOS-capable communications, ending the process. Such normal processing may include operation necessary to determine whether to pair the active communications sessions with other terminals on VAMOS channels.

If the base station determines that the first and second terminals are RF resources that are located within the same wireless device (i.e., determination block 506="Yes"), the base station may accommodate both communications on a single VAMOS channel, thereby saving network resources. In an embodiment, the wireless device may be a DSDA device, with a first RF resource and second RF resource associated with a first SIM (SIM-1) and second SIM (SIM-2), respectively.

In block 508, the base station may re-assign physical channel parameters for the active session on the first terminal to be the same as the active session on the second terminal, with a training sequence code that is different than that of the second terminal. For example, the base station may perform an intra-cell handover of the communications session on SIM-1 by transmitting standard handover commands to the first RF resource that identify a new ARFCN, time slot, and training sequence code. The first RF resource may switch directly to the new channel and time slot without changing previous settings for base station parameters. Alternatively, the base station may re-assign physical channel parameters for the active communications sessions on both SIM-1 and SIM-2 to a new common physical channel, and assigning different training sequences for each terminal.

In block 510, the base station may multiplex the active communications using AQPSK modulation, which, as described above, combines data in the separate communications as mutually orthogonal, binary sub-channels using different associated training sequence codes.

Figure 5B:
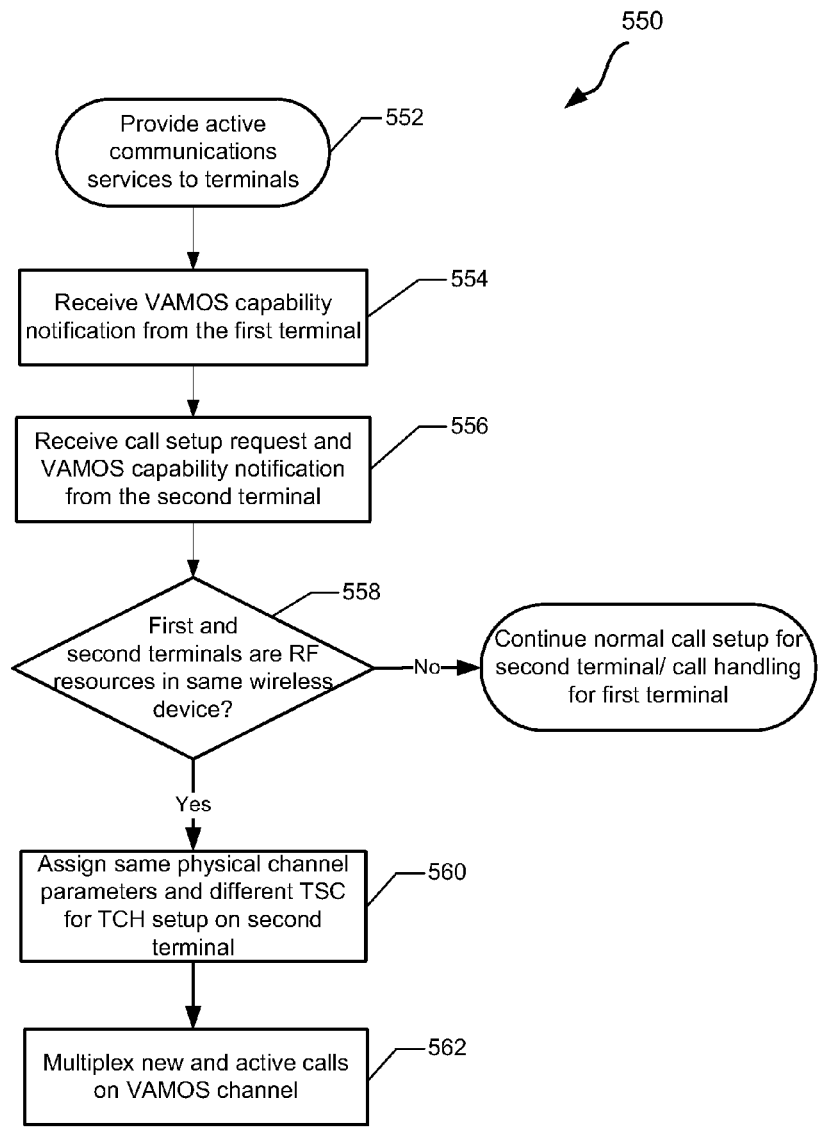

FIG. 5B illustrates another embodiment method 550 of using DSDA communications to further improve network efficiencies in VAMOS mode. In block 552, an access network may provide active communications services to one or more terminals through connections with a nearby base station. In block 554, the base station may receive a notification of VAMOS capability from a first terminal engaged in an active communications session served by the base station. In block 556 the base station may receive a call setup request and notification of VAMOS capability from a second terminal attached to the access network and within the base station vicinity. In determination block 558, the base station may determine whether the first and second terminals are RF resources within the same wireless device. Similar to determination block 506 in method 500, this determination may be made based on whether the first and second terminals are associated with identical IMEIs.

If the base station determines that the first and second terminals are not RF resources within the same wireless device (i.e., determination block 558="No"), the base station may continue with normal call setup operations on the second terminal and/or continue handling the active call on the first terminal. Such call setup and handling may or may not involve VAMOS channels. For example, the base station may assign a VFR or VHR sub-channel to the first terminal to be multiplexed with another VAMOS candidate terminal, or may assign a FR or HR channel for non-VAMOS mode communications.

If the base station determines that the first and second terminals are RF resources within the same wireless device (i.e., determination block 558="Yes"), the base station may accommodate both communications on a single VAMOS channel. For example, as discussed above with respect to FIG. 5A, the wireless device may be a DSDA device that has a first RF resource and second RF resource associated with a first SIM (SIM-1), and second SIM (SIM-2), respectively.

In block 560, the base station may set up a traffic channel for a communications session on the second terminal by assigning the same physical channel parameters as the session on the first terminal, with a different training sequence. For example, the base station may transmit a channel assignment message to the second RF resource that identifies the ARFCN and time slot serving the active call associated with SIM-1, and provides a new training sequence code. In block 562, the base station may multiplex the active call and the newly established call using AQPSK modulation.

In addition to enabling network efficiencies, assigning communications on RF resources coupled to both SIMs of the DSDA device may independently benefit the DSDA device. In particular, since paired VAMOS sub-channels occupy the same timeslot and frequency, the DSDA device may use the same radio for transmit and receive functions of each session. Therefore, the various embodiments may prolong battery power by allowing one of the RF resources to be shut down.

Figure 6:
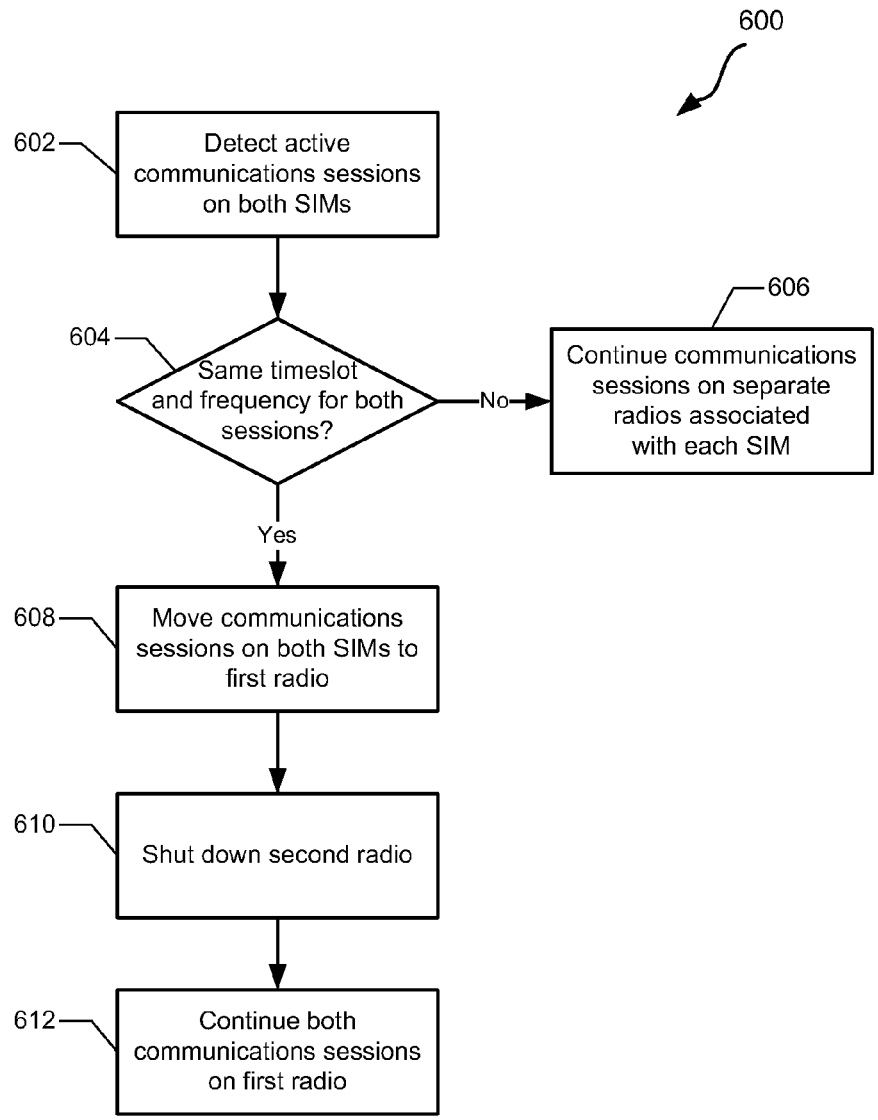
FIG. 6 is a process flow diagram illustrating an embodiment method for optimizing use of radio and power resources on a dual-SIM dual active device.

FIG. 6 illustrates an embodiment method 600 of conserving radio resources on a DSDA device using VAMOS mode. In block 602, a controller in a DSDA device may detect that the two SIMs (e.g., SIM-1 and SIM-2) are each engaged in active communications sessions on the same access network. In block 604, the controller may determine whether the two active communications sessions are paired on one VAMOS channel by determining whether both communications sessions are assigned to the same physical channel parameters (e.g., time slot and ARFCN). If the controller determines that the two active communications are not paired on one VAMOS channel (i.e., determination block 604="No"), the communications sessions may continue normally (i.e., simultaneously on separate RF resources for each SIM), block 606. If the controller determines that both active communications are paired on a VAMOS channel (i.e., determination block 604="Yes"), in block 608 both communications sessions may be moved to the same radio, for example, the RF resource associated with SIM-1. In block 610, the RF resource associated with SIM-2 may be shut down. Alternatively, the wireless device may use the RF resource associated with SIM-2 to perform an unrelated communications function. In block 612, both active communications may continue using a single RF resource (i.e., the RF resource associated with SIM-1), thereby conserving battery power in both the uplink and downlink. Thus, the DSDA device may reduce energy consumption by exploiting VAMOS channel characteristics to enable use of a single RF resource for two active communications sessions.

In addition, simultaneous calls typically may cause a DSDA device that has independent RF resources to experience interference between transmit signals on one radio and receive signals on the other. However, merging the communications onto the same RF resource in the various embodiments may avoid this problem. Moreover, simultaneous use of multiple independent RF resources in the same device consumes a large amount of battery power in both the transmit and receive functions. In the various embodiments, battery power may be conserved in both the uplink and downlink on the wireless device since signals are only sent and received on one RF resource, using only one modulated signal.

As shown above, the various embodiments may improve both a base station's and a multi-SIM wireless device's use of the network's physical layer resources. In VAMOS mode, communications associated with multiple SIMs may share the same physical channel (ARFCN and time slot) on both the uplink and the downlink, except the training sequence codes differ. Data in the active communications sessions on multiple SIMs may be received at the same time on a multi-SIM device, since they are modulated on the same signal, thereby saving receive power on the device. In addition, data in the active communications sessions on multiple SIMs may be received by the network at the same time thereby saving receive power on the base station in an improvement over the existing VAMOS standard. Further, transmitting up to four data sets on a single RF resource, compared to transmitting on up to four RF resources as normally required for such communications, may reduce power consumption on the wireless device. This reduction in transmit power may provide additional improvement over the existing VAMOS standard.

Further benefits of implementing the embodiment methods may be realized due to the essentially identical QoS enabled for the up to four calls by sharing the same physical resources. Since communications with SIMs located within the same wireless device share the same location, the base station may be relieved from performing additional operations to pair VAMOS-capable devices (e.g., determining power requirements, relative distances, re-checking relative distances, etc.).

Figure 7:
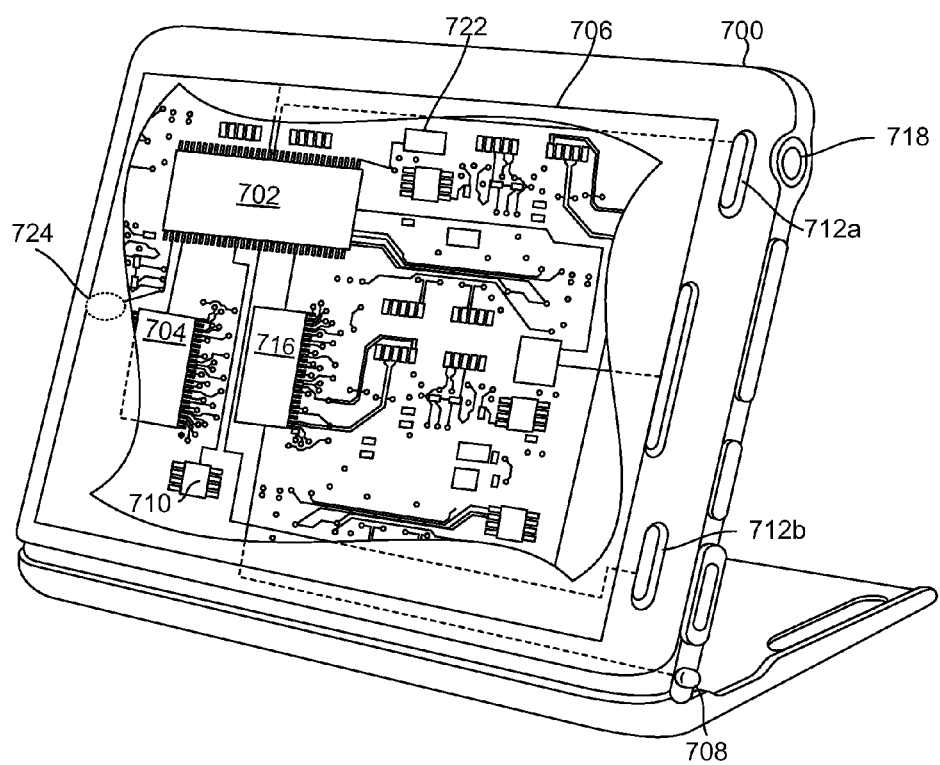
FIG. 7 is a component diagram of an example wireless device suitable for use with the various embodiments.

The various embodiments may be implemented in any of a variety of mobile devices, an example of which is illustrated in FIG. 7. For example, the mobile device 700 may include a processor 702 coupled to internal memories 704 and 710. Internal memories 704 and 710 may be volatile or non-volatile memories, and may also be secure and/or encrypted memories, or unsecure and/or unencrypted memories, or any combination thereof. The processor 702 may also be coupled to a touch screen display 706, such as a resistive-sensing touch screen, capacitive-sensing touch screen infrared sensing touch screen, or the like. Additionally, the display of the mobile device 700 need not have touch screen capability. Additionally, the mobile device 700 may have one or more antenna 708 for sending and receiving electromagnetic radiation that may be connected to a wireless data link and/or cellular telephone transceiver 716 coupled to the processor 702. The mobile device 700 may also include physical buttons 712a and 712b for receiving user inputs. The mobile device 700 may also include a power button 718 for turning the mobile device 700 on and off.

Figure 8:
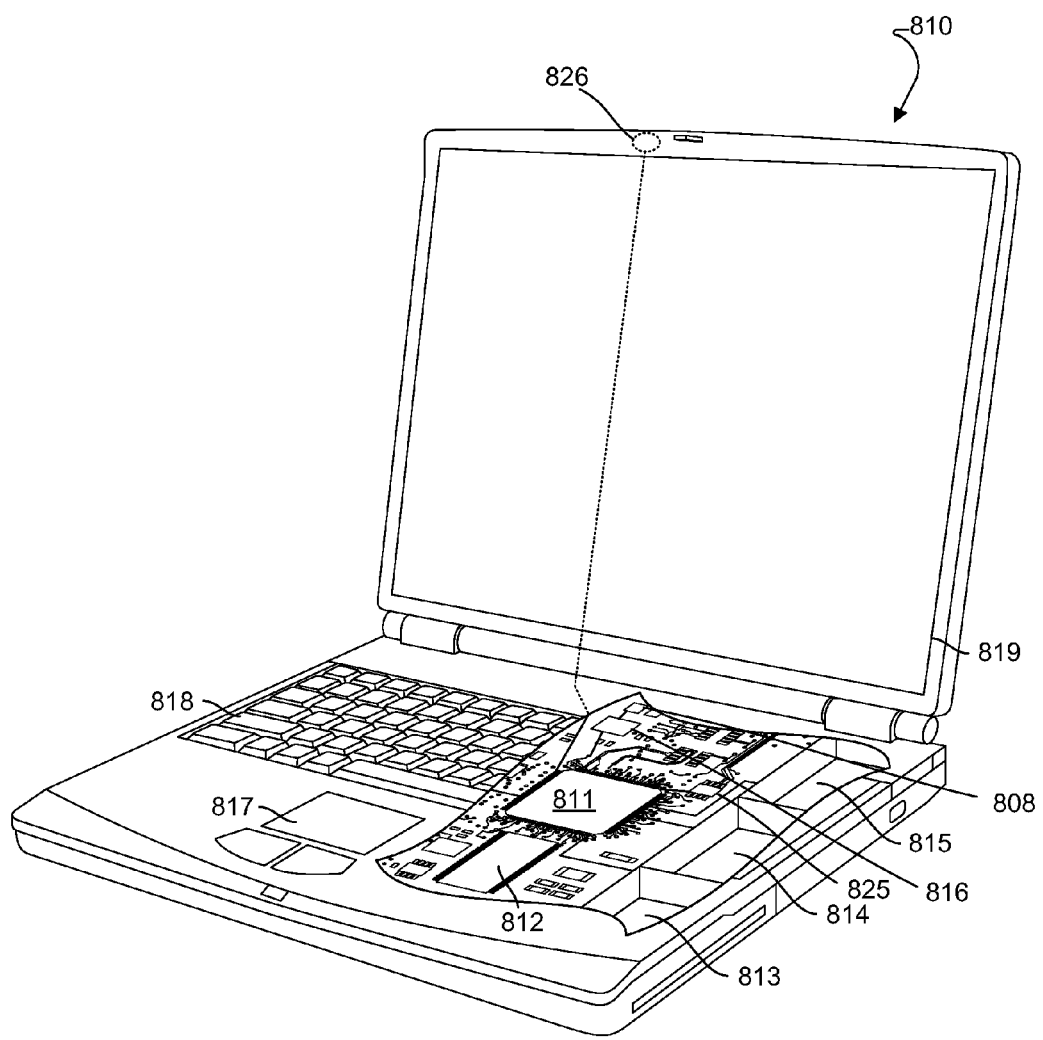
FIG. 8 is a component diagram of another example wireless device suitable for use with the various embodiments.

The various embodiments described above may also be implemented within a variety of personal computing devices, such as a laptop computer 810 as illustrated in FIG. 8. Many laptop computers include a touch pad touch surface 817 that serves as the computer's pointing device, and thus may receive drag, scroll, and flick gestures similar to those implemented on mobile computing devices equipped with a touch screen display and described above. A laptop computer 810 will typically include a processor 811 coupled to volatile memory 812 and a large capacity nonvolatile memory, such as a disk drive 813 of Flash memory. The computer 810 may also include a floppy disc drive 814 and a compact disc (CD) drive 815 coupled to the processor 811. The computer device 710 may also include a number of connector ports coupled to the processor 811 for establishing data connections or receiving external memory devices, such as a USB or FireWire® connector sockets, or other network connection circuits for coupling the processor 811 to a network. In a notebook configuration, the computer housing includes the touchpad 817, the keyboard 818, and the display 819 all coupled to the processor 811. Other configurations of the computing device may include a computer mouse or trackball coupled to the processor (e.g., via a USB input) as are well known, which may also be use in conjunction with the various embodiments.

Figure 9:
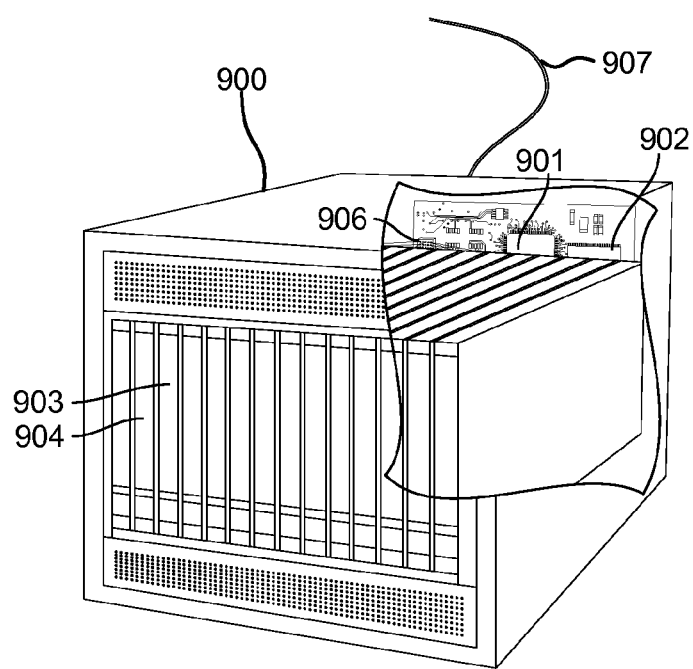
FIG. 9 is a component diagram of an example server suitable for use with the various embodiments.

The various embodiments may also be implemented on any of a variety of commercially available server mobile devices, such as the server 900 illustrated in FIG. 9. Such a server 900 typically includes a processor 901 coupled to volatile memory 902 and a large capacity nonvolatile memory, such as a disk drive 903. The server 900 may also include a floppy disc drive, compact disc (CD) or DVD disc drive 904 coupled to the processor 901. The server 900 may also include network access ports 906 coupled to the processor 901 for establishing network interface connections with a network 907, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors 702, 811, and 901 may be any programmable microprocessor, microcomputer or multiple processor chip or chips that can be configured by software instructions (applications) to perform a variety of functions, including the functions of the various embodiments described above. In some mobile devices, multiple processors may be provided, such as one processor dedicated to wireless communication functions and one processor dedicated to running other applications. Typically, software applications may be stored in the internal memory 704, 710, 812, 813, 902, and 903 before they are accessed and loaded into the processors 702, 811, and 901. The processors 702, 811, and 901 may include internal memory sufficient to store the application software instructions. In many mobile devices the internal memory may be a volatile or nonvolatile memory, such as flash memory, or a mixture of both. For the purposes of this description, a general reference to memory refers to memory accessible by the processors 702, 811, and 901 including internal memory or removable memory plugged into the mobile device and memory within the processor 702, 811, and 901 themselves.

While the terms "first" and "second" are used herein to describe data transmission associated with a SIM and data receiving associated with a different SIM, such identifiers are merely for convenience and are not meant to limit the various embodiments to a particular order, sequence, type of network or carrier. Further, while the various embodiments may be described with respect to two communications sessions assigned to a VAMOS pair, such description is provided merely as an example and is not meant to limit a given VAMOS channel to only two terminals. For example, up to four VAMOS-capable devices may be assigned the same VAMOS channel when using half-rate speech coding.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic mobile device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing mobile devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

The functions of the various embodiments described above may be implemented in hardware, software, firmware, or any combination thereof. If implemented in software, the functions may be stored as one or more instructions or code on a non-transitory computer-readable medium. The operations of a method or algorithm disclosed herein may be embodied in a processor-executable software module, which may reside on a non-transitory computer-readable storage medium. Non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage mobile devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of allocating physical channels by a base station in a wireless communications network, comprising:
receiving, from a first radio frequency (RF) resource associated with a first active communications session, information indicating that the first RF resource is capable of supporting Voice services over Adaptive Multi-user channels on One Slot (VAMOS) communications;
receiving, from a second RF resource associated with a second active communications session, information indicating that the second RF resource is capable of supporting VAMOS communications;
determining whether the first RF resource and the second RF resource are co-located within a single wireless device;
assigning a VAMOS channel to the first and second active communications sessions in response to determining that the first RF resource and the second RF resource are co-located within a single wireless device;
multiplexing the first active communications session and the second active communications session onto subchannels of the assigned VAMOS channel; and
transmitting the first and second active communications sessions simultaneously on the assigned VAMOS channel such that data is simultaneously received by the first RF resource and the second RF resource.

2. The method of claim 1, wherein assigning a VAMOS channel to the first and second active communications sessions comprises:
  assigning a new absolute radio frequency channel number (ARFCN) and time-division multiple access (TDMA) frame time slot to the first active communications session, wherein the new ARFCN and TDMA frame time slot define a physical channel currently in use by the second active communications session; and
  assigning to the first and second active communications sessions different training sequence codes (TSC).

3. The method of claim 2, further comprising performing an intra-cell handover of the first active communications session to the physical channel identified by the new ARFCN and TDMA frame time slot.

4. The method of claim 1, wherein assigning a VAMOS channel to the first and second active communications sessions comprises:
  assigning a new ARFCN and TDMA frame time slot to the first active communications session;
  assigning the new ARFCN and TDMA frame time slot to the second active communications session, wherein the new ARFCN and TDMA frame time slot identify a new physical channel not currently in use by either the first or second active communications session; and
  assigning to the first and second active communications sessions different training sequence codes (TSC).

5. The method of claim 4, further comprising:
  performing an intra-cell handover of the first active communications session to the new physical channel identified by the new ARFCN and time slot; and
  performing an intra-cell handover of the second active communications session to the new physical channel identified by the new ARFCN and TDMA frame time slot.

6. The method of claim 1, wherein the single wireless device is a dual-subscriber identification module dual active (DSDA) wireless device, wherein:
  a first subscriber identification module (SIM) is associated with the first active communications session and the first RF resource; and
  a second SIM is associated with the second active communications session and the second RF resource.

7. The method of claim 6, wherein multiplexing the first active communications session on the second active communications session onto sub-channels of the assigned VAMOS channel comprises modulating data associated with the first SIM and data associated with the second SIM onto a single modulated carrier, wherein:
  two bits are encoded in a modulation symbol; and
  the two bits are dedicated to a first burst bit in the first active communications session and a second burst bit in the second active communications session, respectively.

8. The method of claim 7, wherein modulating data associated with the first SIM and data associated with the second SIM onto a single modulated carrier further comprises using an adaptive quadrature phase-shift keying (AQPSK) modulation scheme.

9. The method of claim 1, wherein determining whether the first RF resource and the second RF resource are co-located within a single wireless device comprises determining whether the first and second active communications sessions are associated with identical International Mobile Station Equipment Identities (IMEIs).

10. The method of claim 1, wherein determining whether the first RF resource and the second RF resource are co-located within a single wireless device comprises determining whether information received from the first RF resource identifies an International Mobile Subscriber Identity (IMSI) associated with the second RF resource.

11. The method of claim 1, wherein the assigned VAMOS channel shares a logical traffic channel with at least a third active communications session, wherein at least one sub-channel carries half-rate coded speech data.

12. The method of claim 11, further comprising:
  receiving, from a third RF resource associated with the third active communications session, information indicating that the third RF resource is capable of supporting VAMOS communications,
  wherein the third active communications session is multiplexed onto one of the at least one sub-channel that carries half-rate coded speech data.

13. The method of claim 12, wherein the third RF resource is co-located with the first and second RF resources in the single wireless device.

14. A method of allocating physical channels by a base station in a wireless communications network, comprising:
  receiving, from a first radio frequency (RF) resource associated with a first active communications session, a notification that the first RF resource is capable of supporting Voice services over Adaptive Multi-user channels on One Slot (VAMOS) communications;
  receiving a setup request for a new active communications session associated with a second RF resource, wherein the setup request includes information indicating that the second RF resource is capable of supporting VAMOS communications;
  determining whether the first RF resource and the second RF resource are co-located within a wireless device;
  setting up the new active communications session on a physical channel currently serving the first active communications session in response to determining that the first RF resource and the second RF resource are co-located within a single wireless device;
  assigning a VAMOS channel to the first active communications session and the new active communications session;
  multiplexing the first active communications session and the new active communications session onto sub-channels of the assigned VAMOS channel; and
  transmitting the first active communications session and the new active communications session simultaneously on the assigned VAMOS channel such that data is simultaneously received by the first RF resource and the second RF resource.

15. The method of claim 14, wherein setting up the new active communications session on the physical channel currently serving the first active communications session comprises:
  assigning to the new active communications session an absolute radio frequency channel number (ARFCN) and a time-division multiple access (TDMA) frame time slot that define the physical channel currently serving the first active communications session; and
  assigning to the new active communications session a training sequence code (TSC) that is different than a TSC currently assigned to the first active communications session.

16. The method of claim 14, wherein single wireless device is a dual-subscriber identification module dual active (DSDA) wireless device, and wherein:
  a first subscriber identification module (SIM) is associated with the first active communications session and the first RF resource; and a second SIM is associated with the new active communications session and the second RF resource.

17. The method of claim 16, wherein multiplexing the first active communications session and the new active communications session onto sub-channels of the assigned VAMOS channel comprises modulating data associated with the first SIM and data associated with the second SIM onto a single modulated carrier, wherein:
   two bits are encoded in a modulation symbol; and
   the two bits are dedicated to a first burst bit in the first active communications session and a second burst bit in the new active communications session, respectively.

18. The method of claim 17, wherein modulating data associated with the first SIM and data associated with the second SIM onto a single modulated carrier further comprises using an adaptive quadrature phase-shift keying (AQPSK) modulation scheme.

19. A method of allocating physical channels by a base station in a wireless communications network, comprising:
   receiving information indicating that a first radio frequency (RF) resource, a second RF resource, and a third RF resource are capable of supporting Voice services over Adaptive Multi-user channels on One Slot (VAMOS) communications;
   determining whether the first, second and third RF resources are co-located within a single wireless device;
   assigning a VAMOS channel to the first, second, and third active communications sessions in response to determining that the first, second, and third RF resources are co-located within a single wireless device;
   multiplexing the first and second active communications sessions onto a first sub-channel of the assigned VAMOS channel, wherein the first and second active communications sessions are allocated to alternating odd and even time-division multiple access (TDMA) frame numbers in a traffic channel multiframe;
   multiplexing the third active communications session onto a second sub-channel of the assigned VAMOS channel;
   transmitting the first and third active communications sessions simultaneously using odd-numbered TDMA frames on the assigned VAMOS channel; and
   transmitting the second and third active communications sessions simultaneously using even-numbered TDMA frames on the assigned VAMOS channel.

20. A method of managing radio frequency (RF) resources on a dual-subscriber identification module dual active (DSDA) device, comprising:
   detecting when a first subscriber identification module (SIM) and a second SIM are participating in active communications sessions respectively on a first and second RF resource, wherein the active communications session on the first SIM is with the same access network as the active communications session on the second SIM;
   determining whether a time slot and frequency assigned to the active communications session on the first SIM matches a time slot and absolute radio frequency channel number (ARFCN) assigned to the active communications session on the second SIM; and
   moving the active communications session on the first SIM to the second RF resource in response to determining that the time slot and ARFCN assigned to the active communications session on the first SIM matches the time slot and ARFCN assigned to the active communications session on the second SIM.

21. The method of claim 20, further comprising shutting off power to the first RF resource.

22. The method of claim 20, further comprising using the first RF resource to transmit and receive communications over a different access network.

23. The method of claim 20, further comprising:
   using an adaptive quadrature phase-shift keying (AQPSK) modulation scheme to send data in the active communications sessions on the first and second SIMs in a single VAMOS transmission on an uplink, in response to determining that the time slot and ARFCN assigned to the active communications session on the first SIM matches the time slot and ARFCN assigned to the active communications session on the second SIM.

24. The method of claim 20, further comprising:
   converting data streams received during the active communications sessions on the first and second SIMs into sound waves, and mixing the sound waves to enable output via a single speaker on the DSDA device.

25. A base station, comprising:
   a network interface;
   an radio frequency (RF) data modem; and
   a processor coupled to the network interface, and the RF data modem, wherein the processor is configured with processor-executable instructions to:
      receive, from a first RF resource associated with a first active communications session, information indicating that the first RF resource is capable of supporting Voice services over Adaptive Multi-user channels on One Slot (VAMOS) communications;
      receive, from a second RF resource associated with a second active communications session, information indicating that the second RF resource is capable of supporting VAMOS communications;
      determine whether the first RF resource and the second RF resource are co-located within a single wireless device;
      assign a VAMOS channel to the first and second active communications sessions in response to determining that the first RF resource and the second RF resource are co-located within a single wireless device;
      multiplex the first active communications session and the second active communications session onto sub-channels of the assigned VAMOS channel; and
      transmit the first and second active communications sessions simultaneously on the assigned VAMOS channel such that data is simultaneously received by the first RF resource and the second RF resource.

26. The base station of claim 25, wherein the processor is configured with processor-executable instructions to assign a VAMOS channel to the first and second active communications sessions by:
   assigning a new absolute radio frequency channel number (ARFCN) and time-division multiple access (TDMA) frame time slot to the first active communications session, wherein the new ARFCN and TDMA frame time slot define a physical channel currently in use by the second active communications session; and
   assigning to the first and second active communications sessions different training sequence codes (TSC).

27. The base station of claim 26, wherein the processor is further configured with processor-executable instructions to perform an intra-cell handover of the first active communications session to the physical channel identified by the new ARFCN and TDMA frame time slot.

28. The base station of claim 25, wherein the processor is configured with processor-executable instructions to assign a VAMOS channel to the first and second active communications sessions by:

assigning a new ARFCN and TDMA frame time slot to the first active communications session;

assigning the new ARFCN and TDMA frame time slot to the second active communications session, wherein the new ARFCN and TDMA frame time slot identify a new physical channel not currently in use by either the first or second active communications session; and assigning to the first and second active communications sessions different training sequence codes (TSC).

29. The base station of claim 28, wherein the processor is configured with processor-executable instructions to:

perform an intra-cell handover of the first active communications session to the new physical channel identified by the new ARFCN and time slot; and perform an intra-cell handover of the second active communications session to the new physical channel identified by the new ARFCN and TDMA frame time slot.

30. The base station of claim 25, wherein the processor is configured with processor-executable instructions to determine whether the first RF resource and the second RF resource are co-located within a single wireless device by determining whether the first RF resource and the second RF resource are located within a dual-subscriber identification module dual active (DSDA) wireless device, wherein:

a first subscriber identification module (SIM) is associated with the first active communications session and the first RF resource; and a second SIM is associated with the second active communications session and the second RF resource.

31. The base station of claim 30, wherein the processor is configured with processor-executable instructions to multiplex the first active communications session on the second active communications session onto sub-channels of the assigned VAMOS channel by modulating data associated with the first SIM and data associated with the second SIM onto a single modulated carrier, wherein:

two bits are encoded in a modulation symbol; and the two bits are dedicated to a first burst bit in the first active communications session and a second burst bit in the second active communications session, respectively.

32. The base station of claim 31, wherein the processor is configured with processor-executable instructions to modulate data associated with the first SIM and data associated with the second SIM onto a single modulated carrier further by using an adaptive quadrature phase-shift keying (AQPSK) modulation scheme.

33. The base station of claim 25, wherein the processor is configured with processor-executable instructions to determine whether the first RF resource and the second RF resource are co-located within a single wireless device by determining whether the first and second active communications sessions are associated with identical International Mobile Station Equipment Identities (IMEIs).

34. The base station of claim 25, wherein the processor is configured with processor-executable instructions to determine whether the first RF resource and the second RF resource are co-located within a single wireless device by determining whether information received from the first RF resource identifies an International Mobile Subscriber Identity (IMSI) associated with the second RF resource.

35. The base station of claim 25, wherein the assigned VAMOS channel shares a logical traffic channel with at least a third active communications session, wherein at least one of the sub-channels carries half-rate coded speech data.

36. The base station of claim 35, wherein the processor is further configured with processor-executable instructions to:

receive, from a third RF resource associated with the third active communications session, information indicating that the third RF resource is capable of supporting VAMOS communications, wherein the third active communications session is multiplexed onto one of the at least one VAMOS sub-channels that carries half-rate coded speech data.

37. The base station of claim 36, wherein the processor is configured to receive information from the third RF resource by receiving information from an RF resource that is co-located with the first and second RF resources in the single wireless device.

38. A base station, comprising:

a network interface;

transmit/receive circuitry; and a processor coupled to the network interface, and the transmit/receive circuitry, wherein the processor is configured with processor-executable instructions to:

receive, from a first radio frequency (RF) resource associated with a first active communications session, a notification that the first RF resource is capable of supporting Voice services over Adaptive Multi-user channels on One Slot (VAMOS) communications;

receive a setup request for a new active communications session associated with a second RF resource, wherein the setup request includes information indicating that the second RF resource is capable of supporting VAMOS communications;

determine whether the first RF resource and the second RF resource are co-located within a single wireless device;

set up the new active communications session on a physical channel currently serving the first active communications session in response to determining that the first RF resource and the second RF resource are co-located within a single wireless device;

assign a VAMOS channel to the first active communications session and the new active communications session;

multiplex the first active communications session and the new active communications session onto sub-channels of the assigned VAMOS channel; and transmit the first active communications session and the new active communications session simultaneously on the assigned VAMOS channel such that data is simultaneously received by the first RF resource and the second RF resource.

39. The base station of claim 38, wherein the processor is configured with processor-executable instructions to set up the new active communications session on the physical channel currently serving the first active communications session by assigning to the new active communications session an absolute radio frequency channel number (ARFCN) and a time-division multiple access (TDMA) frame time slot that define the physical channel currently serving the first active communications session; and assigning to the new active communications session a training sequence codes (TSC) that is different than a TSC currently assigned to the first active communications session.

40. The base station of claim 38, wherein the processor is configured with processor-executable instructions to determine whether the first RF resource and the second RF resource are co-located within a single wireless device by determining whether the first RF resource and the second RF resource are co-located within a dual-subscriber identification module dual active (DSDA) wireless device, wherein:

a first subscriber identification module (SIM) is associated with the first active communications session and the first RF resource; and a second SIM is associated with the new active communications session and the second RF resource.

41. The base station of claim 40, wherein the processor is configured with processor-executable instructions to multiplex the first active communications session and the new active communications session onto sub-channels of the assigned VAMOS channel by modulating data associated with the first SIM and data associated with the second SIM onto a single modulated carrier, wherein:

two bits are encoded in a modulation symbol; and
the two bits are dedicated to a first burst bit in the first active communications session and a second burst bit in the new active communications session, respectively.

42. The base station of claim 40, wherein the processor is configured with processor-executable instructions to modulate data associated with the first SIM and data associated with the second SIM onto a single modulated carrier further by using an adaptive quadrature phase-shift keying (AQPSK) modulation scheme.

43. A base station, comprising:

a network interface;
an radio frequency (RF) data modem; and
a processor coupled to the network interface, and the RF data modem, wherein the processor is configured to:
  receiving receive information indicating that a first RF resource, a second RF resource, and a third RF resource are capable of supporting Voice services over Adaptive Multi-user channels on One Slot (VAMOS) communications;
  determine whether the first, second and third RF resources are co-located within a single wireless device;
  assign a VAMOS channel to the first, second, and third active communications sessions in response to determining that the first, second, and third RF resources are co-located within a single wireless device;
  multiplex the first and second active communications sessions onto a first sub-channel of the assigned VAMOS channel, wherein the first and second active communications sessions are allocated to alternating odd and even TDMA frame numbers in a traffic channel multiframe;
  multiplex the third active communications session onto a second sub-channel of the assigned VAMOS channel;
  transmit the first and third active communications sessions simultaneously using odd-numbered TDMA frames on the assigned VAMOS channel; and
  transmit the second and third active communications sessions simultaneously using even-numbered TDMA frames on the assigned VAMOS channel.

44. A wireless device, comprising:

a processor coupled to a first radio frequency (RF) resource, and a second RF resource, wherein the processor is configured to perform operations comprising:
  detecting when a first subscriber identification module (SIM) associated with the first RF resource and a second SIM associated with the second RF resource are participating in active communications sessions respectively on the first and second RF resources, wherein the active communications session on the first SIM is with the same access network as the active communications session on the second SIM;
  determining whether a time slot and frequency assigned to the active communications session on the first SIM matches a time slot and absolute radio frequency channel number (ARFCN) assigned to the active communications session on the second SIM; and
  moving the active communications session on the first SIM to the second RF resource in response to determining that the time slot and ARFCN assigned to the active communications session on the first SIM matches the time slot and ARFCN assigned to the active communications session on the second SIM.

45. The wireless device of claim 44, wherein the processor is configured to perform operations further comprising shutting off power to the first RF resource.

46. The wireless device of claim 44, wherein the processor is configured to perform operations further comprising using the first RF resource to transmit and receive communications over a different access network.

47. The wireless device of claim 44, wherein the processor is configured to perform operations further comprising:

using an adaptive quadrature phase-shift keying (AQPSK) modulation scheme to send data in the active communications sessions on the first and second SIMs in a single Voice services over Adaptive Multi-user channels on One Slot (VAMOS) transmission on an uplink, in response to determining that the time slot and ARFCN assigned to the active communications session on the first SIM matches the time slot and ARFCN assigned to the active communications session on the second SIM.

48. The wireless device of claim 44, further comprising:

converting data streams received during the active communications sessions on the first and second SIMs into sound waves, and mixing the sound waves to enable output via a single speaker on the wireless device.

49. A base station in a wireless communications network, comprising:

means for receiving, from a first radio frequency (RF) resource associated with a first active communications session, information indicating that the first RF resource is capable of supporting Voice services over Adaptive Multi-user channels on One Slot (VAMOS) communications;
means for receiving, from a second RF resource associated with a second active communications session, information indicating that the second RF resource is capable of supporting VAMOS communications;
means for determining whether the first RF resource and the second RF resource are co-located within a single wireless device;
means for assigning a VAMOS channel to the first and second active communications sessions in response to determining that the first RF resource and the second RF resource are co-located within a single wireless device;
means for multiplexing the first active communications session and the second active communications session onto sub-channels of the assigned VAMOS channel; and
means for transmitting the first and second active communications sessions simultaneously on the assigned VAMOS channel such that data is simultaneously received by the first RF resource and the second RF resource.

50. The base station of claim 49, wherein means for assigning a VAMOS channel to the first and second active communications sessions comprises:

means for assigning a new absolute radio frequency channel number (ARFCN) and time-division multiple access (TDMA) frame time slot to the first active communications session, wherein the new ARFCN and TDMA frame time slot define a physical channel currently in use by the second active communications session; and means for assigning to the first and second active communications sessions different training sequence codes (TSC).

51. The base station of claim 50, further comprising means for performing an intra-cell handover of the first active communications session to the physical channel identified by the new ARFCN and TDMA frame time slot.

52. The base station of claim 49, wherein means for assigning a VAMOS channel to the first and second active communications sessions comprises:

means for assigning a new ARFCN and TDMA frame time slot to the first active communications session;

means for assigning the new ARFCN and TDMA frame time slot to the second active communications session, wherein the new ARFCN and TDMA frame time slot identify a new physical channel not currently in use by either the first or second active communications session; and means for assigning to the first and second active communications sessions different training sequence codes (TSC).

53. The base station of claim 52, further comprising:

means for performing an intra-cell handover of the first active communications session to the new physical channel identified by the new ARFCN and time slot; and means for performing an intra-cell handover of the second active communications session to the new physical channel identified by the new ARFCN and TDMA frame time slot.

54. The base station of claim 49, wherein means for determining whether the first RF resource and the second RF resource are co-located within a single wireless device comprises means for determining whether the first RF resource and the second RF resource are located within a dual-subscriber identification module dual active (DSDA) wireless device, wherein:

a first subscriber identification module (SIM) is associated with the first active communications session and the first RF resource; and a second SIM is associated with the second active communications session and the second RF resource.

55. The base station of claim 54, wherein multiplexing the first active communications session on the second active communications session onto sub-channels of the assigned VAMOS channel comprises modulating data associated with the first SIM and data associated with the second SIM onto a single modulated carrier, wherein:

two bits are encoded in a modulation symbol; and the two bits are dedicated to a first burst bit in the first active communications session and a second burst bit in the second active communications session, respectively.

56. The base station of claim 55, wherein means for modulating data associated with the first SIM and data associated with the second SIM onto a single modulated carrier further comprises means for using an adaptive quadrature phase-shift keying (AQPSK) modulation scheme.

57. The base station of claim 49, wherein means for determining whether the first RF resource and the second RF resource are co-located within a single wireless device comprises means for determining whether the first and second active communications sessions are associated with identical International Mobile Station Equipment Identities (IMEIs).

58. The base station of claim 49, wherein means for determining whether the first RF resource and the second RF resource are co-located within a single wireless device comprises means for determining whether information received from the first RF resource identifies an International Mobile Subscriber Identity (IMSI) associated with the second RF resource.

59. The base station of claim 49, wherein the assigned VAMOS channel shares a logical traffic channel with at least a third active communications session, wherein at least one of the sub-channels carries half-rate coded speech data.

60. The base station of claim 59, further comprising means for receiving, from a third RF resource associated with the third active communications session, information indicating that the third RF resource is capable of supporting VAMOS communications, wherein the third active communications session is multiplexed onto one of the at least one VAMOS sub-channels that carries half-rate coded speech data.

61. The base station of claim 60, wherein means for receiving information from a third RF resource comprises means for receiving information from an RF resource that is co-located with the first and second RF resources in the single wireless device.

62. A base station in a wireless communications network, comprising:

means for receiving, from a first radio frequency (RF) resource associated with a first active communications session, a notification that the first RF resource is capable of supporting Voice services over Adaptive Multi-user channels on One Slot (VAMOS) communications;

means for receiving a setup request for a new active communications session associated with a second RF resource, wherein the setup request includes information indicating that the second RF resource is capable of supporting VAMOS communications;

means for determining whether the first RF resource and the second RF resource are co-located within a single wireless device;

means for setting up the new active communications session on a physical channel currently serving the first active communications session in response to determining that the first RF resource and the second RF resource are co-located within a single wireless device;

means for assigning a VAMOS channel to the first active communications session and the new active communications session;

means for multiplexing the first active communications session and the new active communications session onto sub-channels of the assigned VAMOS channel; and means for transmitting the first active communications session and the new active communications session simultaneously on the assigned VAMOS channel such that data is simultaneously received by the first RF resource and the second RF resource.

63. The base station of claim 62, wherein means for setting up the new active communications session on the physical channel currently serving the first active communications session comprises:

means for assigning to the new active communications session an ARFCN and a time-division multiple access (TDMA) frame time slot that define the physical channel currently serving the first active communications session; and means for assigning to the new active communications session a training sequence code (TSC) that is different than a TSC currently assigned to the first active communications session.

64. The base station of claim 62, wherein means for determining whether the first RF resource and the second RF resource are co-located within a single wireless device comprises means for determining whether the first RF resource and the second RF resource are located within a dual-subscriber identification module dual active (DSDA) wireless device, wherein:
  a first SIM is associated with the first active communications session and the first RF resource; and
  a second SIM is associated with the new active communications session and the second RF resource.

65. The base station of claim 64, wherein means for multiplexing the first active communications session and the new active communications session onto sub-channels of the assigned VAMOS channel comprises means for modulating data associated with the first SIM and data associated with the second SIM onto a single modulated carrier, wherein:
  two bits are encoded in a modulation symbol; and
  the two bits are dedicated to a first burst bit in the first active communications session and a second burst bit in the new active communications session, respectively.

66. The base station of claim 65, wherein means for modulating data associated with the first SIM and data associated with the second SIM onto a single modulated carrier further comprises means for using an adaptive quadrature phase-shift keying (AQPSK) modulation scheme.

67. A base station in a wireless communications network, comprising:
  means for receiving information indicating that a first radio frequency (RF) resource, a second RF resource, and a third RF resource are capable of supporting Voice services over Adaptive Multi-user channels on One Slot (VAMOS) communications;
  means for determining whether the first, second and third RF resources are co-located within a single wireless device;
  means for assigning a VAMOS channel to the first, second, and third active communications sessions in response to determining that the first, second, and third RF resources are co-located within a single wireless device;
  means for multiplexing the first and second active communications sessions onto a first sub-channel of the assigned VAMOS channel, wherein the first and second active communications sessions are allocated to alternating odd and even time-division multiple access (TDMA) frame numbers in a traffic channel multiframe;
  means for multiplexing the third active communications session onto a second sub-channel of the assigned VAMOS channel;
  means for transmitting the first and third active communications sessions simultaneously using odd-numbered TDMA frames on the assigned VAMOS channel; and
  means for transmitting the second and third active communications sessions simultaneously using even-numbered TDMA frames on the assigned VAMOS channel.

68. A dual-subscriber identification module dual active (DSDA) device, comprising:
  means for detecting when a first subscriber identification module (SIM) and a second SIM are participating in active communications sessions respectively on a first and second RF resource, wherein the active communications session on the first SIM is with the same access network as the active communications session on the second SIM;
  means for determining whether a time slot and frequency assigned to the active communications session on the first SIM matches a time slot and absolute radio frequency channel number (ARFCN) assigned to the active communications session on the second SIM; and
  means for moving the active communications session on the first SIM to the second RF resource in response to determining that the time slot and ARFCN assigned to the active communications session on the first SIM matches the time slot and ARFCN assigned to the active communications session on the second SIM.

69. The DSDA device of claim 68, further comprising means for shutting off power to the first RF resource.

70. The DSDA device of claim 68, further comprising means for using the first RF resource to transmit and receive communications over a different access network.

71. The DSDA device of claim 68, further comprising:
  means for using an adaptive quadrature phase-shift keying (AQPSK) modulation scheme to send data in the active communications sessions on the first and second SIMs in a single VAMOS transmission on an uplink, in response to determining that the time slot and ARFCN assigned to the active communications session on the first SIM matches the time slot and ARFCN assigned to the active communications session on the second SIM.

72. The DSDA device of claim 68, further comprising:
  means for converting data streams received during the active communications sessions on the first and second SIMs into sound waves, and means for mixing the sound waves to enable output via a single speaker on the DSDA device.

73. A non-transitory computer-readable medium having stored thereon processor-executable instructions configured to cause a processor of a base station to perform operations comprising:
  receiving, from a first radio frequency (RF) resource associated with a first active communications session, information indicating that the first RF resource is capable of supporting Voice services over Adaptive Multi-user channels on One Slot (VAMOS) communications;
  receiving, from a second RF resource associated with a second active communications session, information indicating that the second RF resource is capable of supporting VAMOS communications;
  determining whether the first RF resource and the second RF resource are co-located within a single wireless device;
  assigning a VAMOS channel to the first and second active communications sessions in response to determining that the first RF resource and the second RF resource are co-located within a single wireless device;
  multiplexing the first active communications session and the second active communications session onto sub-channels of the assigned VAMOS channel; and
  transmitting the first and second active communications sessions simultaneously on the assigned VAMOS channel such that data is simultaneously received by the first RF resource and the second RF resource.

74. The non-transitory computer-readable medium of claim 73, wherein the stored processor-executable instructions are configured to cause the base station processor to perform operations such that assigning a VAMOS channel to the first and second active communications sessions comprises:
  assigning a new absolute radio frequency channel number (ARFCN) and time-division multiple access (TDMA) frame time slot to the first active communications session, wherein the new ARFCN and TDMA frame time slot define a physical channel currently in use by the second active communications session; and
  assigning to the first and second active communications sessions different training sequence codes (TSC).

75. The non-transitory computer-readable medium of claim 74, wherein the stored processor-executable instructions are configured to cause the base station processor to perform operations further comprising performing an intra-cell handover of the first active communications session to the physical channel identified by the new ARFCN and TDMA frame time slot.

76. The non-transitory computer-readable medium of claim 73, wherein the stored processor-executable instructions are configured to cause the base station processor to perform operations such that assigning a VAMOS channel to the first and second active communications sessions comprises:
 assigning a new ARFCN and TDMA frame time slot to the first active communications session;
 assigning the new ARFCN and TDMA frame time slot to the second active communications session, wherein the new ARFCN and TDMA frame time slot identify a new physical channel not currently in use by either the first or second active communications session; and
 assigning to the first and second active communications sessions different training sequence codes (TSC).

77. The non-transitory computer-readable medium of claim 76, wherein the stored processor-executable instructions are configured to cause the base station processor to perform operations further comprising:
 performing an intra-cell handover of the first active communications session to the new physical channel identified by the new ARFCN and time slot; and
 performing an intra-cell handover of the second active communications session to the new physical channel identified by the new ARFCN and TDMA frame time slot.

78. The non-transitory computer-readable storage medium of claim 73, wherein the stored processor-executable instructions are configured to cause the base station processor to perform operations such that determining whether the first RF resource and the second RF resource are co-located within a single wireless device comprises determining whether the first RF resource and the second RF resource are co-located within a dual-subscriber identification module dual active (DSDA) wireless device, wherein:
 a first subscriber identification module (SIM) is associated with the first active communications session and the first RF resource; and
 a second SIM is associated with the second active communications session and the second RF resource.

79. The non-transitory computer-readable storage medium of claim 78, wherein the stored processor-executable instructions are configured to cause the base station processor to perform operations such that multiplexing the first active communications session on the second active communications session onto sub-channels of the assigned VAMOS channel comprises modulating data associated with the first SIM and data associated with the second SIM onto a single modulated carrier, wherein:
 two bits are encoded in a modulation symbol; and
 the two bits are dedicated to a first burst bit in the first active communications session and a second burst bit in the second active communications session, respectively.

80. The non-transitory computer-readable storage medium of claim 79, wherein the stored processor-executable instructions are configured to cause the base station processor to perform operations such that modulating data associated with the first SIM and data associated with the second SIM onto a single modulated carrier further comprises using an adaptive quadrature phase-shift keying (AQPSK) modulation scheme.

81. The non-transitory computer-readable storage medium of claim 73, wherein the stored processor-executable instructions are configured to cause the base station processor to perform operations such that determining whether the first and second active communications sessions are associated with identical International Mobile Station Equipment Identities (IMEIs).

82. The non-transitory computer-readable storage medium of claim 73, wherein the stored processor-executable instructions are configured to cause the base station processor to perform operations such that wherein determining whether the first RF resource and the second RF resource are co-located within a single wireless device comprises determining whether information received from the first RF resource identifies an International Mobile Subscriber Identity (IMSI) associated with the second RF resource.

83. The non-transitory computer-readable storage medium of claim 73, wherein the assigned VAMOS channel shares a logical traffic channel with at least a third active communications session, wherein at least one of the sub-channels carries half-rate coded speech data.

84. The non-transitory computer-readable storage medium of claim 83, wherein the stored processor-executable instructions are configured to cause the base station processor to perform operations further comprising:
 receiving, from a third RF resource associated with the third active communications session, information indicating that the third RF resource is capable of supporting VAMOS communications,
 wherein the third active communications session is multiplexed onto one of the at least one VAMOS sub-channels that carries half-rate coded speech data.

85. The non-transitory computer-readable storage medium of claim 84, wherein the stored processor-executable instructions are configured to cause the base station processor to perform operations such that receiving information from the third RF resource comprises receiving information from an RF resource that is co-located with the first and second RF resources in the single wireless device.

86. A non-transitory computer-readable storage medium having stored thereon processor-executable instructions configured to cause a base station processor to perform operations comprising:
 receiving, from a first radio frequency (RF) resource, a notification that the first RF resource is capable of supporting Voice services over Adaptive Multi-user channels on One Slot (VAMOS) communications;
 receiving a setup request for a new active communications session associated with a second RF resource, wherein the setup request includes information indicating that the second RF resource is capable of supporting VAMOS communications;
 determining whether the first RF resource and the second RF resource are co-located within a single wireless device;
 setting up the new active communications session on a physical channel currently serving the first active communications session in response to determining that the first RF resource and the second RF resource are co-located within a single wireless device;
 assigning a VAMOS channel to the first active communications session and the new active communications session;
 multiplexing the first active communications session and the new active communications session onto sub-channels of the assigned VAMOS channel; and
 transmitting the first active communications session and the new active communications session simultaneously on the assigned VAMOS channel such that data is simultaneously received by the first RF resource and the second RF resource.

87. The non-transitory computer-readable storage medium of claim 86, wherein the stored processor-executable instructions are configured to cause the base station processor to perform operations such that setting up the new active communications session on the physical channel currently serving the first active communications session comprises:

assigning to the new active communications session an ARFCN and a time-division multiple access (TDMA) frame time slot that define the physical channel currently serving the first active communications session; and assigning to the new active communications session a training sequence code (TSC) that is different than a TSC currently assigned to the first active communications session.

88. The non-transitory computer-readable storage medium of claim 86, wherein the stored processor-executable instructions are configured to cause the base station processor to perform operations such that determining whether the first RF resource and the second RF resource are co-located within a single wireless device comprises determining whether first RF resource and the second RF resource are located within a dual-subscriber identification module dual active (DSDA) wireless device, wherein:

a first subscriber identification module (SIM) is associated with the first active communications session and the first RF resource; and a second SIM is associated with the new active communications session and the second RF resource.

89. The non-transitory computer-readable storage medium of claim 86, wherein the stored processor-executable instructions are configured to cause the base station processor to perform operations such that multiplexing the first active communications session and the new active communications session onto sub-channels of the assigned VAMOS channel comprises modulating data associated with a first SIM and data associated with a second SIM onto a single modulated carrier, wherein:

two bits are encoded in a modulation symbol; and the two bits are dedicated to a first burst bit in the first active communications session and a second burst bit in the new active communications session, respectively.

90. The non-transitory computer-readable storage medium of claim 89, wherein the stored processor-executable instructions are configured to cause the base station processor to perform operations such that modulating data associated with the first SIM and data associated with the second SIM onto a single modulated carrier further comprises using an adaptive quadrature phase-shift keying (AQPSK) modulation scheme.

91. A non-transitory computer-readable storage medium having stored thereon processor-executable instructions configured to cause a base station processor to perform operations comprising:

receiving information indicating that a first radio frequency (RF) resource, a second RF resource, and a third RF resource are capable of supporting Voice services over Adaptive Multi-user channels on One Slot (VAMOS) communications;

determining whether the first, second and third RF resources are co-located within a single wireless device;

assigning a VAMOS channel to the first, second, and third active communications sessions in response to determining that the first, second, and third RF resources are co-located within a single wireless device;

multiplexing the first and second active communications sessions onto a first sub-channel of the assigned VAMOS channel, wherein the first and second active communications sessions are allocated to alternating odd and even time-division multiple access (TDMA) frame numbers in a traffic channel multiframe;

multiplexing the third active communications session onto a second sub-channel of the assigned VAMOS channel;

transmitting the first and third active communications sessions simultaneously using odd-numbered TDMA frames on the assigned VAMOS channel; and transmitting the second and third active communications sessions simultaneously using even-numbered TDMA frames on the assigned VAMOS channel.

92. A non-transitory computer-readable storage medium having stored thereon processor-executable instructions that are configured to cause a dual-subscriber identification module dual active (DSDA) device processor to perform operations comprising:

detecting when a first subscriber identification module (SIM) and a second SIM are participating in active communications sessions respectively on a first and second RF resource, wherein the active communications session on the first SIM is with the same access network as the active communications session on the second SIM;

determining whether a time slot and frequency assigned to the active communications session on the first SIM matches a time slot and absolute radio frequency channel number (ARFCN) assigned to the active communications session on the second SIM; and moving the active communications session on the first SIM to the second RF resource in response to determining that the time slot and ARFCN assigned to the active communications session on the first SIM matches the time slot and ARFCN assigned to the active communications session on the second SIM.

93. The non-transitory computer-readable storage medium of claim 92, wherein the stored processor-executable instructions are configured to cause the DSDA device processor to perform operations further comprising shutting off power to the first RF resource.

94. The non-transitory computer-readable storage medium of claim 92, wherein the stored processor-executable instructions are configured to cause the DSDA device processor to perform operations further comprising using the first RF resource to transmit and receive communications over a different access network.

95. The non-transitory computer-readable storage medium of claim 92, wherein the stored processor-executable instructions are configured to cause the DSDA device processor to perform operations further comprising:

using an adaptive quadrature phase-shift keying (AQPSK) modulation scheme to send data in the active communications sessions on the first and second SIMs in a single VAMOS transmission on an uplink, in response to determining that the time slot and ARFCN assigned to the active communications session on the first SIM matches the time slot and ARFCN assigned to the active communications session on the second SIM.

96. The non-transitory computer-readable storage medium of claim 92, wherein the stored processor-executable instructions are configured to cause the DSDA device processor to perform operations further comprising:

converting data streams received during the active communications sessions on the first and second SIMs into sound waves, and mixing the sound waves to enable output via a single speaker on the DSDA device.

* * * * *